US012151717B2

(12) United States Patent
Zhao et al.

(10) Patent No.: US 12,151,717 B2
(45) Date of Patent: Nov. 26, 2024

(54) SINGLE-DOOR CONTROL CIRCUIT FOR TRAIN

(71) Applicant: CRRC Nanjing Puzhen Co., Ltd., Nanjing (CN)

(72) Inventors: Hong Zhao, Nanjing (CN); Pengcheng Dai, Nanjing (CN); Lian Ge, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 752 days.

(21) Appl. No.: 17/436,620

(22) PCT Filed: Nov. 11, 2020

(86) PCT No.: PCT/CN2020/128070

§ 371 (c)(1),
(2) Date: Sep. 6, 2021

(87) PCT Pub. No.: WO2022/088259

PCT Pub. Date: May 5, 2022

(65) Prior Publication Data

US 2022/0325564 A1 Oct. 13, 2022

(30) Foreign Application Priority Data

Oct. 26, 2020 (CN) ......................... 202011156687.X

(51) Int. Cl.
*E05B 81/56* (2014.01)
*B61D 19/00* (2006.01)
(Continued)

(52) U.S. Cl.
CPC .............. *B61D 19/00* (2013.01); *E05B 81/04* (2013.01); *E05B 81/54* (2013.01); *E05B 81/56* (2013.01);
(Continued)

(58) Field of Classification Search
CPC .......... E05B 81/56; E05B 81/54; E05B 81/74; E05B 81/80; E05B 81/04; E05B 81/72;
(Continued)

(56) References Cited

U.S. PATENT DOCUMENTS

2005/0052081 A1* 3/2005 Sayama .................... H02J 1/14 307/10.1
2005/0102903 A1* 5/2005 Takahashi ............... E05F 15/41 318/136
(Continued)

FOREIGN PATENT DOCUMENTS

CN 202125146 U 1/2012
CN 106285246 A * 1/2017 ............. E05B 81/54
(Continued)

*Primary Examiner* — Zachary L Kuhfuss
*Assistant Examiner* — James William Jones
(74) *Attorney, Agent, or Firm* — Bayramoglu Law Offices LLC

(57) ABSTRACT

A single-door control circuit for a train includes a first circuit for controlling a single door when the train is in a sleep state, and a second circuit for controlling a door of the train when the train is in a wake-up activated state. When the train is in the sleep state, the second circuit is not electrified, the first circuit works, a door control unit is electrified by a storage battery power supply, and the single-door control is triggered by an electric unlocking switch or a single-door button; and when the train is in the wake-up activated state, the first circuit is cut off, the second circuit is electrified, and
(Continued)

under a condition that a cab on a local side is activated and the train is at a zero velocity, the single-door control is only triggered by activating the single-door button in the cab.

14 Claims, 1 Drawing Sheet

(51) Int. Cl.

| | |
|---|---|
| ***E05B 81/04*** | (2014.01) |
| ***E05B 81/54*** | (2014.01) |
| ***E05B 81/58*** | (2014.01) |
| ***E05B 81/60*** | (2014.01) |
| ***E05B 81/62*** | (2014.01) |
| ***E05B 81/72*** | (2014.01) |
| ***E05B 81/74*** | (2014.01) |
| ***E05B 83/36*** | (2014.01) |

(52) U.S. Cl.
CPC .............. *E05B 81/58* (2013.01); *E05B 81/60* (2013.01); *E05B 81/62* (2013.01); *E05B 81/72* (2013.01); *E05B 81/74* (2013.01); *E05B 83/363* (2013.01)

(58) Field of Classification Search
CPC .......... E05B 81/58; E05B 81/60; E05B 81/62; E05B 83/363; B61D 19/00–26
USPC ........ 246/304, 127, 130; 105/343, 348, 349, 105/395
See application file for complete search history.

(56) References Cited

U.S. PATENT DOCUMENTS

| | | | | |
|---|---|---|---|---|
| 2013/0103964 | A1* | 4/2013 | Peveling ................. | G06F 1/305 713/323 |
| 2019/0242175 | A1* | 8/2019 | Fujita ..................... | B61D 19/00 |

FOREIGN PATENT DOCUMENTS

| | | | | | |
|---|---|---|---|---|---|
| CN | 109162544 | A | * | 1/2019 | ............. E05B 81/04 |
| CN | 109469421 | A | * | 3/2019 | .............. E05F 15/70 |
| CN | 109505481 | A | * | 3/2019 | ........... B61D 19/023 |
| CN | 109826530 | A | | 5/2019 | |
| FR | 2709720 | A1 | * | 3/1995 | ............. B61D 19/02 |
| GB | 2557850 | A | * | 6/2018 | ............. E05B 81/54 |

* cited by examiner

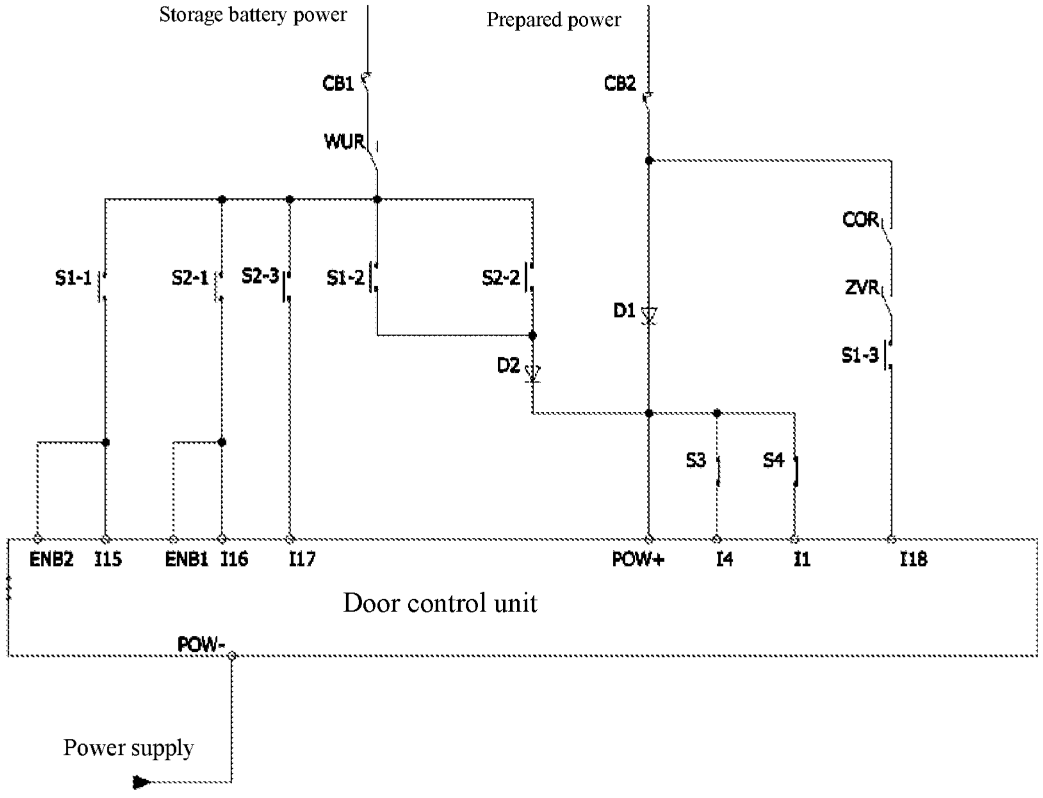
Storage battery power
Prepared power
CB1
CB2
WUR
COR
ZVR
S1-1
S2-1
S2-3
S1-2
S2-2
D1
D2
S1-3
S3
S4
ENB2
I15
ENB1
I16
I17
POW+
I4
I1
I18
Door control unit
POW-
Power supply

SINGLE-DOOR CONTROL CIRCUIT FOR TRAIN

CROSS REFERENCE TO THE RELATED APPLICATIONS

This application is the national stage entry of International Application No. PCT/CN2020/128070, filed on Nov. 11, 2020, which is based upon and claims priority to Chinese Patent Application No. 202011156687.X filed on Oct. 26, 2020, the entire contents of which are incorporated herein by reference.

TECHNICAL FIELD

The present invention relates to a single-door control circuit for a railway vehicle in sleep and wake-up states, which is applicable to a tram or a driverless train without a cab door.

BACKGROUND

In a conventional tram or driverless train, when the cab door is not provided, a driver or maintenance staff gets on the train through the nearest passenger door close to the cab, and in this case, generally only pure mechanical devices are taken into consideration for single-door unlock, or a complex time delay and holding circuit is designed for single-door unlock.

The existing internal/external mechanical unlocking device has a purely mechanical structure, which is connected to an adjacent door through a wire rope, and pulls an end unlocking device of a load-bearing drive mechanism through the wire rope to unlock the door. However, it only unlocks the door, and the door needs to be opened manually.

The existing single-door unlocking control circuit is additionally provided with a relay, a contactor, a time delay and holding circuit, so that the design of the control circuit is complex, and the cost of circuit design and the failure rate are increased.

In order to ensure the service life of the mechanical unlocking device and reduce the cost of circuit design, it is very important to design a simple and reliable circuit.

SUMMARY

A main object of the present invention is to solve the problems in the prior art, and provides a single-door control circuit for a train which ensures the service life of mechanical devices, and reduces the circuit design cost and the failure rate and improves the reliability.

In order to solve the technical problem described above, the present invention provides a single-door control circuit for a train having a door control unit, a single-door button located in a cab and an electric unlocking switch located outside the door of the train, characterized in that the single-door control circuit for the train comprises a first circuit for controlling a single door when the train is in a sleep state, and a second circuit for controlling a door of the train when the train is in a wake-up activated state, the door control unit is provided with a power input port, a first signal port of the single-door button, a signal port of the electric unlocking switch, and a second signal port of the single-door button, the first circuit includes: a normally-closed contact of a wake-up relay connected to a positive pole of a storage battery power supply of the train, and a first contact of the single-door button connected between a low-potential terminal of the normally-closed contact of the wake-up relay and the first signal port of the single-door button; a first contact of the electric unlocking switch connected between the low-potential terminal of the normally-closed contact of the wake-up relay and the signal port of the electric unlocking switch; and a second contact of the single-door button and a second contact of the electric unlocking switch connected in parallel between the low-potential terminal of the normally-closed contact of the wake-up relay and the power input port; and the second circuit includes: a power supply line connected between a positive pole of a prepared power supply of the train and the power input port, and a normally-open contact of a cab activation relay, a normally-open contact of a zero velocity relay and a third contact of the single-door button are sequentially connected in series between the positive pole of the prepared power supply of the train and the second signal port of the single-door button.

The present invention further provides a train, characterized by comprising a single-door control circuit for a train as described above.

In addition, the present invention also relates to a single-door control method for a train, characterized in that the method is performed by the single-door control circuit for the train described above. The method comprises single-door control for the train in a sleep state with the following process:

when the train is in the sleep state, a charger does not work, the prepared power supply does not supply power, the wake-up relay of the train is not electrified, the normally-closed contact of the wake-up relay is closed, the door control unit is electrified by a storage battery, and the single-door control can be triggered by the electric unlocking switch or the single-door button:

when the electric unlocking switch outside the door of the train is rotated to an unlock position, the first normally-open contact of the electric unlocking switch and the second normally-open contact of the electric unlocking switch are closed, the power input port of the door control unit is electrified, the signal received by the signal port of the electric unlocking switch changes from the low level to the high level, and a door controller performs a single-door opening/closing operation based on monitoring the current state of the single door, specifically, if the single door is currently in an open state, a closing operation is executed, and if the single door is currently in a closed state, an opening operation is executed; and when the single-door button in the cab is pressed, the first normally-open contact and the second normally-open contact of the single-door button are closed, the power input port of the door control unit is electrified, the signal received by the first signal port of the single-door button changes from the low level to the high level, and the door controller performs a single-door opening/closing operation based on monitoring the current state of the single door, specifically, if the single door is currently in the open state, the closing operation is executed, and if the single door is currently in the closed state, the opening operation is executed.

The method comprises single-door control for the train in a wake-up activated state with the following process:

when the train is in the wake-up activated state, the wake-up relay of the train is electrified, the normally-closed contact of the wake-up relay is disconnected, the charger works, the door control unit is electrified by the prepared power supply, the power input port of the door control unit is electrified, and the single-door control is triggered only by the single-door button in the cab; and when the cab is currently activated and the train is in a zero velocity state, the cab activation relay and the zero velocity relay are electrified, the normally-open contact of the cab activation relay and the normally-open contact of the zero velocity relay are closed, the single-door button in the cab is pressed down, the third normally-open contact of the single-door button is closed, the signal received by the second signal port of the single-door button changes from the low level to the high level, and the door controller performs a single-door opening/closing operation based on monitoring the current state of the single door, specifically, if the single door is currently in the open state, the closing operation is executed, and if the single door is currently in the closed state, the opening operation is executed.

The invention has the following beneficial effects: the invention provides an optimal design for single-door control, in which an electric unlocking key (self-reset) outside the train is installed outside a passenger door closest to the left side and the right side of the cab, and a single-door button (self-reset) in the cab is provided in the cab. Before the train wakes up, the charger does not work, the electric unlocking key outside the train or the single-door button in the cab is connected to storage battery power, and another contact of the electric unlocking key give a door opening/closing pulse signal. The self-reset design of the electric unlocking key outside the train and the single-door button in the cab prevent continuous power consumption of the storage battery, thereby reducing the cost and saving the energy. After the train wakes up, the electric unlocking key outside the train is disabled, the charger works, an auxiliary inverter supplies power for the systems of the whole train, and the door controller acquires a door enabling signal, and the single-door button in the cab performs single door opening and closing. The door controller also acquires signals for controlling door opening, door closing, zero velocity and door enabling in a centralized manner so as to achieve a centralized door opening and closing function.

The invention not only ensures the service life of mechanical devices, but also reduces the circuit design cost and the failure rate and improves the reliability.

BRIEF DESCRIPTION OF THE DRAWINGS

FIGURE shows a schematic diagram of a single-door control circuit for a train according to the present invention.

DETAILED DESCRIPTION OF THE EMBODIMENTS

Embodiments of the present invention will now be described with reference to the accompanying drawings.

An electric unlocking switch (knob type) outside the train is installed outside a passenger door closes to the left side and the right side of a cab, and a single-door button is provided on a driver's console. A single-door control circuit is shown in the FIGURE.

The train has a door control unit, a single-door button located in a cab, and an electric unlocking switch located outside a door of the train. During the process of opening or closing a door of the train, a close-in-place switch and a clock-in-place switch are triggered to operate, and a door controller judges whether the door is opened or not by monitoring the states of a normally-closed contact of the close-in-place switch S3 and a normally-closed contact of the door lock-in-place switch S4 of the door of the train. When the normally-closed contact of the close-in-place switch S3 and the normally-closed contact of the door lock-in-place switch S4 are closed, the door is considered to be in an open state; and when the normally-closed contact of the close-in-place switch S3 and the normally-closed contact of the door lock-in-place switch S4 are opened, the vehicle door is considered to be in a closed state.

As shown in the FIGURE, in this embodiment, the single-door control circuit for the train comprises a first circuit for controlling a single door when the train is in a sleep state, and a second circuit for controlling a door of the train when the train is in a wake-up activated state. The door control unit is provided with a power input port POW+, a first signal port of the single-door button I15, a signal port of the electric unlocking switch I16, a second signal port of the single-door button I18, an enable signal port of the single-door button ENB2, an enable signal port of the electric unlocking switch ENB1, a monitoring port of the close-in-place switch I4, and a monitoring port of the lock-in-place switch I1.

The first circuit includes: a single-door control circuit breaker CB1 and a normally-closed contact of a wake-up relay WUR connected in series to a positive pole of a storage battery power supply of the train, and a first contact of the single-door button S1-1 connected between a low-potential terminal of the normally-closed contact of the wake-up relay WUR and the first signal port of the single-door button I15; a first contact of the electric unlocking switch S2-1 connected between the low-potential terminal of the normally-closed contact of the wake-up relay WUR and the signal port of the electric unlocking switch I16; and a second contact of the single-door button S1-2 and a second contact of the electric unlocking switch S2-2 connected in parallel between low-potential terminal of the normally-closed contact of the wake-up relay WUR and the power input port POW+. The enable signal port of the single-door button ENB2 is short circuited with the first signal port of the single-door button I15; and the enable signal port of the electric unlocking switch ENB1 is short circuited with the signal port of the electric unlocking switch I16.

The second circuit includes: a power supply line connected between a positive pole of a prepared power supply of the train and the power input port POW+, and a normally-open contact of a cab activation relay COR, a normally-open contact of a zero velocity relay ZVR and a third contact of the single-door button S1-3 are sequentially connected in series between the positive pole of the prepared power supply of the train and the second signal port of the single-door button I18. A door controller circuit breaker CB2 is connected in series between the positive pole of the prepared power supply of the train and the power input port POW+.

As shown in the FIGURE, a first diode D1 is connected in series between a normally-closed contact of the door controller circuit breaker CB2 and the power input port POW+; and a second diode D2 is connected in series between the normally-closed contact of the wake-up relay (WUR) and the power input port POW+.

A normally-closed contact of the close-in-place switch S3 is connected between the monitoring port of the close-in-place switch I4 and the power input port POW+, and a normally-closed contact of the lock-in-place switch S4 is connected between the monitoring port of the lock-in-place switch I1 and the power input port POW+.

The control logic of the door control unit is as follows: when the power supply input port POW+ is electrified, a signal received by the signal port of the electric unlocking switch I16 changes from a low level to a high level and keeps the high level for more than 100 ms, and at the same time the enable signal port of the electric unlocking switch ENB1 short-circuited with the port I16 receives the same instruction, the switch signal of the electric unlocking switch outside the door of the train is considered to be effective, and a door opening operation or a door closing operation is executed according to a current state of the single door; and when the power input port (POW+) is electrified, a signal received by the first signal port of the single-door button (I15) changes from a low level to a high level and keeps the high level for more than 100 ms, and at the same time the enable signal port of the single-door button ENB1 short-circuited with the port I15 receives the same instruction, the switch signal of the single-door button in the cab is considered to be effective, and a door opening operation or a door closing operation is executed according to a current state of the single door.

The single-door control method for the train provided by the invention is illustrated with reference to a practical application scenario as follows:

single-door opening control before the train wakes up:

before the train wakes up, the wake-up relay is not electrified, the normally-closed contact of the wake-up relay WUR is closed, the driver rotates the electric unlocking switch outside the train to an unlock position for 6 s (for initializing power-on of the door controller), the second normally-open contact of the electric unlocking switch S2-2 is closed, and the door control unit receives power of the storage battery for 6 s; the first normally-open contact of the electric unlocking switch S2-1 is closed for 6 s, the signal received by the signal port of the electric unlocking switch I16 changes from the low level to the high level and keeps the high level for more than 100 ms, so the switch signal of the electric unlocking switch and the enabling signal of the electric unlocking switch are considered to be effective, and at the same time, the door controller monitors that the normally-closed contact of the close-in-place switch S3 and the normally-closed contact of the lock-in-place switch S4 are opened, and as the door is default in the closed state, an opening operation is performed on the closed door, then the normally-closed contact of the close-in-place switch S3 and the normally-closed contact of the lock-in-place switch S4 are closed, and the driver gets on the train.

After the driver gets on the train, the train is activated, the cab is activated, the charger works, and an auxiliary inverter provides prepared power for the systems of the whole train. At this moment, the wake-up relay is electrified, the normally-closed contact of the wake-up relay WUR is disconnected, the power supply of the storage battery is cut off, and the electric unlocking switch outside the door is disabled. In the zero-velocity state of the train, the single-door button in the cab is pressed, a third normally-open contact of the single-door button S1-3 is closed, the door control unit detects that the switch signal of the second signal port of the single-door button I18 changes from the low level to the high level, and keeps the high level state for more than 100 ms, so the switch signal, i.e., "the door opening/closing signal of the single-door button in the cab (train activated)" is considered to be effective, and at the same time, the door controller monitors that the normally-closed contact of the close-in-place switch S3 and the normally-closed contact of the lock-in-place switch S4 are closed, and a closing operation is performed on the door which has been opened, thereafter the normally-closed contact of the close-in-place switch S3 and the normally-closed contact of the lock-in-place switch S4 are disconnected. When the single-door button in the cab is pressed again, the door controller detects the switch signal, i.e., "the door opening/closing signal of the single-door button in the cab (train activated)" and an effective enable signal of the single-door button in the cab, and an opening operation is performed on the single door which has been closed. After the train wakes up and is activated, the single-door control also responds to centralized door opening/closing control of the train.

After the train sleeps, the charger stops working, the prepared power of the train is off, the activation relay is not electrified, and the normally-closed contact of the activation relay WUR is closed. When the driver needs to get off the train, the single-door button is pressed, and the first contact S1-1 and the second contact S1-2 of the single-door button are closed. The door control unit receives the power supply of the storage battery, and detects that the switch signal of the first signal port of the single-door button I15 changes from the low level to the high level and keeps the high level for more than 100 ms, so the switch signal of the single-door button and the enabling signal of the single-door button in the cab are considered to be effective, and then the closed door is controlled to be opened, and the driver gets off the train.

After the driver gets off the train, the driver rotates the electric unlocking switch outside the train to an unlock position for 6 s (for initializing power-on of the door controller), the second normally-open contact of the electric unlocking switch S2-2 is closed, and the door control unit receives power of the storage battery for 6 s; and the first normally-open contact of the electric unlocking switch S2-1 is closed for 6 s, the signal received by the signal port of the electric unlocking switch I16 changes from the low level to the high level and keeps the high level for more than 100 ms, so the switch signal of the electric unlocking switch and the enabling signal of the electric unlocking switch are considered to be effective, and at the same time, the door controller monitors that the normally-closed contact of the close-in-place switch S3 and the normally-closed contact of the lock-in-place switch S4 are closed, and then the opened door is controlled to be closed.

In addition to the embodiments described above, other embodiments of the invention are possible. All technical solutions formed by equivalent replacements or equivalent transformations fall within the protection scope of the present invention.

What is claimed is:

1. A single-door control circuit for a train, having a door control unit, a single-door button located in a cab, and an electric unlocking switch located outside a door of the train, wherein the single-door control circuit for the train comprises a first circuit for controlling a single door when the train is in a sleep state, and a second circuit for controlling the door of the train when the train is in a wake-up activated state, the door control unit is provided with a power input port (POW+), a first signal port of the single-door button (I15), a signal port of the electric unlocking switch (I16), and a second signal port of the single-door button (I18), the first circuit comprises:

a normally-closed contact of a wake-up relay (WUR) connected to a positive pole of a storage battery power supply of the train, a first contact of the single-door button (S1-1) connected between a low-potential terminal of the normally-closed contact of the wake-up relay (WUR) and the first signal port of the single-door button (I15);

a first contact of the electric unlocking switch (S2-1) connected between the low-potential terminal of the normally-closed contact of the wake-up relay (WUR) and the signal port of the electric unlocking switch (I16);

a second contact of the single-door button (S1-2) and a second contact of the electric unlocking switch (S2-2) connected in parallel between the low-potential terminal of the normally-closed contact of the wake-up relay (WUR) and the power input port (POW+); and the second circuit comprises:

a power supply line connected between a positive pole of a prepared power supply of the train and the power input port (POW+), a normally-open contact of a cab activation relay (COR), a normally-open contact of a zero velocity relay (ZVR) and a third contact of the single-door button (S1-3), wherein the normally-open contact of the cab activation relay (COR), the normally-open contact of the zero velocity relay (ZVR) and the third contact of the single-door button (S1-3) are sequentially connected in series between the positive pole of the prepared power supply of the train and the second signal port of the single-door button (I18).

2. The single-door control circuit for the train according to claim 1, wherein the door control unit is further provided with an enable signal port of the single-door button (ENB2) and an enable signal port of the electric unlocking switch (ENB1), the enable signal port of the single-door button (ENB2) being is connected to the first signal port of the single-door button (I15) through a first wire; and the enable signal port of the electric unlocking switch (ENB1)-being is connected to the signal port of the electric unlocking switch (I16) through a second wire.

3. The single-door control circuit for the train according to claim 1, wherein a single-door control circuit breaker (CB1) is connected in series between the normally-closed contact of the wake-up relay (WUR) and the positive pole of the storage battery power supply of the train.

4. The single-door control circuit for the train according to claim 1, wherein a door controller circuit breaker (CB2) is connected in series between the positive pole of the prepared power supply of the train and the power input port (POW+).

5. The single-door control circuit for the train according to claim 1, wherein a first diode (D1) is connected in series between a normally-closed contact of a door controller circuit breaker (CB2) and the power input port (POW+); and a second diode (D2) is connected in series between the normally-closed contact of the wake-up relay (WUR) and the power input port (POW+).

6. The single-door control circuit for the train according to claim 1, further comprising a close-in-place switch and a lock-in-place switch, wherein the door control unit is further provided with a monitoring port of the close-in-place switch (I4) and a monitoring port of the lock-in-place switch (I1), a normally-closed contact of the close-in-place switch (S3) is connected between the monitoring port of the close-in-place switch (I4) and the power input port (POW+), and a normally-closed contact of the lock-in-place switch (S4) is connected between the monitoring port of the lock-in-place switch (I1) and the power input port (POW+).

7. The single-door control circuit for the train according to claim 1, wherein a control logic of the door control unit is as follows:

when the power supply input port (POW+) is electrified, a first signal received by the signal port of the electric unlocking switch (I16) changes from a low level to a high level and keeps the high level for more than 100 ms, a switch signal of the electric unlocking switch outside the door of the train is considered to be effective, and a door opening operation or a door closing operation is executed according to a current state of the single door; and when the power input port (POW+) is electrified, a second signal received by the first signal port of the single-door button (I15) changes from the low level to the high level and keeps the high level for more than 100 ms, a switch signal of the single-door button in the cab is considered to be effective, and the door opening operation or the door closing operation is executed according to the current state of the single door.

8. A train, comprising the single-door control circuit for the train according to claim 1.

9. The train according to claim 8, wherein the door control unit is further provided with an enable signal port of the single-door button (ENB2) and an enable signal port of the electric unlocking switch (ENB1), the enable signal port of the single-door button (ENB2) is connected to the first signal port of the single-door button (I15) through a first wire; and the enable signal port of the electric unlocking switch (ENB1) is connected to the signal port of the electric unlocking switch (I16) through a second wire.

10. The train according to claim 8, wherein a single-door control circuit breaker (CB1) is connected in series between the normally-closed contact of the wake-up relay (WUR) and the positive pole of the storage battery power supply of the train.

11. The train according to claim 8, wherein a door controller circuit breaker (CB2) is connected in series between the positive pole of the prepared power supply of the train and the power input port (POW+).

12. The train according to claim 8, wherein a first diode (D1) is connected in series between a normally-closed contact of a door controller circuit breaker (CB2) and the power input port (POW+); and a second diode (D2) is connected in series between the normally-closed contact of the wake-up relay (WUR) and the power input port (POW+).

13. The train according to claim 8, further comprising a close-in-place switch and a lock-in-place switch, wherein the door control unit is further provided with a monitoring port of the close-in-place switch (I4) and a monitoring port of the lock-in-place switch (I1), a normally-closed contact of the close-in-place switch (S3) is connected between the monitoring port of the close-in-place switch (I4) and the power input port (POW+), and a normally-closed contact of the lock-in-place switch (S4) is connected between the monitoring port of the lock-in-place switch (I1) and the power input port (POW+).

14. The train according to claim 8, wherein a control logic of the door control unit is as follows:

when the power supply input port (POW+) is electrified, a first signal received by the signal port of the electric unlocking switch (I16) changes from a low level to a high level and keeps the high level for more than 100 ms, a switch signal of the electric unlocking switch outside the door of the train is considered to be effective, and a door opening operation or a door closing operation is executed according to a current state of the single door; and when the power input port (POW+) is electrified, a second signal received by the first signal port of the single-door button (I15) changes from the low level to the high level and keeps the high level for more than 100 ms, a switch signal of the single-door button in the cab is considered to be effective, and the door opening operation or the door closing operation is executed according to the current state of the single door.

* * * * *